United States Patent Office

2,929,792
Patented Mar. 22, 1960

2,929,792

PREPARATION OF SHAPED CATALYSTS

Melvin R. Arnold and Edward K. Dienes, Louisville, Ky., assignors to Chemetron Corporation, a corporation of Delaware No Drawing. Application June 26, 1957
Serial No. 668,017

7 Claims. (Cl. 252—430)

Our invention relates generally to shaped catalysts such as tablets, spheres, Raschig rings, and the like which may be formed by conventional pelleting operations such as compression in dies or extrusion methods. More particularly this invention relates to the utilization of certain materials as additives in the preparation of such catalysts, which materials not only have lubricating properties during the pelleting operation but also, even though they may be decomposed and removed during subsequent processing of the shaped catalysts, exhibit improved binding properties and produce stronger and more rugged shaped catalyst pellets. The term "pellets" as used herein and in the claims is meant to include any of the conventional forms of shaped catalysts such as cylinders, tablets, rings, or spheres.

Catalyst pellets which are used in either fixed or movable beds must be physically strong and in most cases sufficiently rugged to stand up for many months use during which time they may be subjected to high temperatures and rather drastic treatments such as steaming and oxidation or reduction. In case of catalysts which consist of relatively small proportions of catalytic material supported upon large proportions of inert carriers such as alumina, it is usually a simple matter to achieve the desired strength by utilizing a strong carrier material. However, this means of achieving high strength may not be used in producing certain catalysts, particularly those in which it is requisite that large amounts of the catalytically active material be present or in which high porosity or low density is required in order that a large surface area be provided. Familiar examples of catalysts in which high concentrations of catalytically active ingredients must be utilized are tungsten oxide, copper chromite, iron oxide, copper oxide, and the nickel-kieselguhr catalysts.

We are aware that the use of binders such as sodium silicate, bonding clay, gums, and thermosetting resins has been proposed as facilitating the preparation of such catalysts. In many cases however, the use of such bonding agents is disadvantageous for their presence within the catalysts, either by dilution or by poisoning of the catalytically active materials, reduces the activity of the catalysts. Even mild poisoning, such as may be the result of a reduction of the porosity or an increase in the density of the catalyst which reduces the available surface of the catalytic ingredients, prevents full utilization of the catalytically active ingredients. Accordingly, it is an object of our invention to provide a method of preparing the more difficult to prepare catalysts in such manner that shaped catalyst pellets having higher mechanical strength and ruggedness, without accompanying reduction in catalytical activity or in full utilization of the available catalytic ingredients, are produced.

It is a further object to provide improved catalysts suitable for long service with high catalytic activity throughout the life of the catalysts.

A further object is to provide a relatively simple method of preparation which may be carried out utilizing conventional mixing and pellet forming apparatus.

Other objects and advantages of this invention will be apparent to those who are familiar with the art upon the reading of the following detailed description and the appended claims.

We have discovered that the addition of very small amounts of certain synthetic resin latices to pulverulent catalytic materials prior to the pellet forming operation not only facilitates the formation of the pellets but also results in shaped catalysts having unimpaired catalytic activity and significantly higher mechanical strength. The particular latices which we utilize are believed to provide not only a lubricating effect during pelleting but also to exert a binding action which facilitates the interwelding of the catalyst particles and persists even after high temperature treatments which decompose and vaporize the synthetic resin of the latex. What actually is responsible for these improved results is not understood, and we have been unable to explain satisfactorily why the adhesive bonding properties imparted by the latex, which bonding properties would be expected to be transitory, persist after such high temperature treatment. Repeated tests, however, have demonstrated that the catalysts produced by our novel method have higher physical strength not only before but after high temperature treatment.

The latices which we have found to be suitable as additives in our process are aqueous dispersions of finely divided vinyl-type resins in which the resin particles are colloidal in size (0.05 to 15 microns). By the term vinyl-type is meant not only the well known vinyl resins such as vinyl acetate and vinyl chloride but also other vinyl materials, such as acrylic acid, methyl methacrylate, and butadiene-styrene, formed by polymerizing monomers characterized by the structural formula:

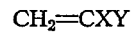

$$CH_2\!=\!CXY$$

In this formula, X may be a halogen or an organic radical, and Y may be either a hydrogen atom, a halogen or an organic radical. The vinyl-type resin latices in many instances will be formed of resin copolymers, but certain homopolymers such as polyvinyl acetate are also suitable. The vinyl-type resin latices which we have found to be suitable in our method are those resin latices which are suitable as vehicles for synthetic resin-base paints. A very thorough discussion of these lattices, their manufacture and physical properties may be found in an article entitled, "Aqueous Coatings" by Dr. Phillip Heiberger appearing in volume 29 (February 1957) No. 385, pages 100 to 157, of the "Official Digest" published by the Federation of Paint and Varnish Production Clubs, Philadelphia, Pennsylvania, reference to which is hereby made.

The vinyl-type latices generally contain about 50 percent water and 50 percent solids. They are usually formed by emulsion polymerization of monomers in aqueous dispersions. Accordingly, since substantial amounts of water are required to form the aqueous monomer emulsions for polymerization, correspondingly large amounts of water are usually present in the resulting latices. These latices usually contain the emulsifiers, which are necessary in forming the monomer water emulsion, and stabilizers which prevent settling or creaming of the polymerized resin. As will be later described, the amount of water in the latex is not particularly critical so long as it is sufficient to maintain the latex in a stable non-coagulated condition prior to admixture with the catalyst ingredients. If additional water is necessary to render a particular mixture of catalyst ingredients and latex pelletable, it may be added with the latex during mixing. If, on the other hand, too much water is present after the admixture of the latex and the catalyst ingredients, the excess may be readily removed by mild drying operations.

Conversely, the amount of the solid resin present in the latex in relation to the amount of the catalyst ingredients is important, and experiment has shown that a minimum of one half percent resin by weight is necessary in order to achieve the advantages of our invention. Moreover, amounts of resin in excess of about five percent do not result in appreciable improvement in the mechanical properties of the finished catalysts and may in some cases interfere with the catalytic activity of the catalysts produced. The term "catalyst ingredients" as used herein and in the claims is meant to include both the catalytically active materials and any inert carrier or support material.

The particle size of the catalyst ingredients may be varied rather widely from a fraction of a micron up to about 20 mesh. In most instances the catalytically active constituents, such as metal salts or oxides, will be quite finely divided. Ingredients which serve as supports, such as the kieselguhr employed in the nickel catalyst more specifically described in Example 4, preferably have larger particle sizes.

In general the process of our invention involves the following steps:

(1) Pulverulent catalyst ingredients are prepared in any conventional manner, such as by precipitation or grinding.
(2) Such materials, in the amounts desired in the finished catalyst, are admixed with a predetermined quantity of the vinyl-type resin latex.
(3) The water content of the admixture is adjusted, preferably by controlled drying, under mild conditions to remove some of the water from the latex, whereby the latex forms an adhesive film about the individual particles of the pulverulent material.
(4) The partially dried mixture is pelleted by compacting the material into shaped pellets under mechanical pressure (this step may be effected in one or more stages with intermittent granulation between stages if desired).
(5) The thus formed pellets are dried to remove substantially all of the remaining water.

In most instances after the foregoing steps have been performed, the catalysts will be in such condition that they may be stored, shipped, charged into a reactor, or otherwise handled. However, in many instances an additional operation upon the catalyst will have to be performed in order to effect a chemical or physical change in the catalytically active material before the catalyst can be placed in service. For catalysts which are active in the reduced state, a high temperature reduction in hydrogen or other reducing gas may be required. Even more frequently a high temperature calcination step is required in order to convert metal salts to the oxide form or remove volatile materials. Either of these operations will in most instances completely decompose the synthetic resin of the latex which has been incorporated in the catalyst, because the usual calcination and reduction temperatures are in excess of the decomposition temperatures of the vinyl-type resins employed. Most manufacturers of catalysts will find it convenient to carry out calcination operations as the final stage in the production of catalysts, prior to shipment of the catalyst for installation in the plant where it is to be utilized. Where reduction is required, however, the reduced form of the catalyst is frequently not stable when exposed to air, and it is more convenient to perform the reduction step only after the catalyst has been installed in the reactor where it is to be used. Otherwise, means such as inert gas blanketing or submersion in liquid materials may be required in order to keep the catalyst out of contact with air.

The following specific examples demonstrate how the process of our invention may be applied to the manufacture of particular catalysts. Because the principles of this invention may be applied to a wide variety of catalysts, these examples are illustrative only and should not be construed as limiting the invention to the particular catalysts described.

*Example 1*

A series of copper chromite catalysts was prepared from granulated copper chromite. The copper chromite was prepared by controlled calcination of a precipitate of a copper ammonium chromate obtained by adding ammonia to a solution of copper nitrate and chromium nitrate. The copper ammonium chromate precipitate was dried and calcined in air at a temperautre of about 800° F. until black in color. The calcined precipitate was then granulated and employed to prepare the series of catalysts.

To prepare each batch of catalyst a weighted amount of granulated copper chromite was charged into a Simpson Muller mixer together with sufficient graphite so that the graphite was 4% by weight of the copper chromite. About 15% to 20% water, based on the weight of copper chromite, was added to render the batch readily mixable. In those cases where latex was added, the water was added with the latex. The particular latex utilized was an aqueous polyvinyl acetate latex sold under the tradename "Elvacet Grade 81–900" by E. I. du Pont de Nemours and Company. This latex contained 55 percent solids, exhibited a viscosity of 8–10 Brookfield, and had an average particle size of 1 to 3 microns. Weighed amounts of this latex mixed with added water were added to the copper chromite while in the mixer. For all the batches, mixing was continued for 5 to 10 minutes. Following mixing, the batches were removed from the mixer and spread on trays and there dried in air for four hours. To certain of the batches an aqueous solution of chromic acid ($CrO_3$), which is known to improve the pelleting properties of copper chromite, was substituted for a portion of the water.

The air dried materials were "slugged" into ¾" x ¾" cylindrical pellets in a Stokes tabletting machine. These pellets were then granulated, passed through a 12 mesh sieve and again pelleted. The final pellets were ¼" by ¼" cylinders. These cylinders were dried in air at 250° F. for four hours and were then calcined in air at a temperature of 800° F. for eight hours. To obtain a comparison as to physical strength, between catalyst batches made with and without latex, the ¼" x ¼" pellets were subjected to dead weight crush tests while lying upon their sides. A number of pellets from each batch were tested both before and after the final calcination. The following table gives the formulation of the several batches and the physical strength test results.

| Batch | Latex—Percent Latex by weight of copper chromite | Chromic Acid—Percent $CrO_3$ by weight of copper chromite | Pelleting Properties | Average Crush Strength in Lbs. | |
|---|---|---|---|---|---|
| | | | | Before Calcination | After Calcination |
| 1 | None | None | Could not be pelleted. | | |
| 2 | None | None | do | | |
| 3 | (¹) 2 | None | Good pellets | 30 | 30 |
| 4 | None | 5 | do | 30 | 22 |
| 5 | (¹) 2 | 5 | Excellent pellets | 58 | 42 |
| 6 | (¹) 4 | 5 | do | 54 | 36 |

¹ (The latex employed contained 55% solids and, accordingly, the numerical percentages given may be halved to obtain the approximate percentages of resin added.)

From the foregoing it will be readily apparent that without the addition of the vinyl-type resin latex the pelleting properties were so poor that when no chomite acid was employed pellets could not be formed. When chromic acid was added satisfactory pellets were obtainable, but they did not maintain their strength upon calcination. Thus the material of Batch 4 would be likely to have a relatively short life as a commercial catalyst. Batches 1 and 2 were, of course, unusable. Batch 2 was essentially a rerun of Batch 1 starting with newly prepared copper chromite. When only latex was employed, the catalyst formed good pellets and exhibited the same crush strength both before and after calcination. This is remarkable, for the polyvinyl acetate from the latex would be expected to be completely decomposed by calcination for eight hours at 800° F.

The catalysts of Batches 5 and 6, made by adding both polyvinyl acetate latex and chromic acid, are definitely very superior, having excellent pelleting properties and very high crush strengths both before and after calcination. The catalysts of Batches 3, 4, 5 and 6 exhibited satisfactory catalytic properties for the hydrogenation of fatty acid esters and other organic compounds.

*Example 2*

The method of preparation set out in detail in Example 1 was repeated in an identical manner except that the drying step following mixing of the batches was considerably shortened in order to accelerate the preparation of test catalysts. Four batches were prepared. In two of the batches the same polyvinyl acetate latex of Example 1 was used and in the other two a similar vinyl-type, aqueous, polyacrylate ester resin latex (55% solids) sold under the trade name "Acrysol A.S.E. 75" by Rohm and Haas Company, was employed. The batches prepared from the two different latices exhibited substantially similar physical properties indicating that the two latices are physically equivalent for purposes of the present invention despite the difference in the chemical formulation of the resins. The following table gives the formulation of the several batches and the results of the crush tests.

| Batch | Type of Latex [1] | Percent Chromic Acid | Average Crush Strength in Pounds | |
|---|---|---|---|---|
| | | | Before Calcination | After Calcination |
| 4 | Polyacrylate | None | 55 | 19 |
| 5 | do | 5 | 58 | 23 |
| 6 | Polyvinyl Acetate | None | 55 | 23 |
| 7 | do | 5 | 65 | 25 |

[1] 2% latex, based upon weight of copper chromite was employed for all batches.

A comparison of the crush strength after calcination reported above for batches 6 and 7 with those of Batches 3 and 5 of Example 1 shows the importance of the drying step following mixing of the batch and before pelleting. The calcined pellets prepared in batches 6 and 7 of Example 2 which had a substantially shorter drying step, had side crush strengths approximately 25% lower than those of Example 1 where a longer drying time was allowed. It is believed that during drying the latex gives up moisture and forms an adhesive film around the particles of catalytic material which film facilitates the interwelding or agglomeration of the particles, and, if sufficient drying time is not allowed for good film formation, maximum strength pellets are not finally obtained.

*Example 3*

Zinc copper chromite catalyst powder was prepared by coprecipitating zinc copper ammonium chromate by the controlled addition of ammonia to an aqueous solution containing about 5 parts by weight of $ZnSO_4 \cdot 5H_2O$, about 2.5 parts by weight of $CuSO_4 \cdot 5H_2O$ and about 14.2 parts by weight of $CrO_3$. The coprecipitate was calcined in air and used in preparing the catalyst of this example. The pellets were made by the same method as Batch No. 5 of Example 1, i.e., the coprecipitate was thoroughly mixed with 2 percent polyvinyl acetate latex and 5 percent chromic acid, was "slugged," granulated, and pelleted into cylindrical pellets ¼" by ¼". The pelleting properties of this material were excellent, the pellets exhibiting a side crush strength of 54 pounds dead weight load before calcination and a side crush strength of 39 pounds dead weight load after calcination at 800° F. This catalyst has excellent activity in various hydrogenations as well as in the synthesis of methanol.

*Example 4*

Nickel oxide-kieselguhr catalyst powder was produced by a modification of the method of Kayser described in Patent 1,004,434, i.e., precipitation of nickel carbonate onto kieselguhr by the controlled addition of a carbonate of sodium to an aqueous nickel salt solution. The material after calcination had a nickel concentration (as nickel metal) of about 60%. 1500 parts by weight of this material were mixed with 45 parts of graphite. To this mixture were added 75 parts of chromic acid anhydride dissolved in 125 parts by weight of water, and the batch was mulled for three minutes. 30 parts by weight of the polyvinyl acetate latex described in Example 1 were mixed with 30 parts of water and added to the mixture. The resulting mixture was mulled for five more minutes. The mulled mixture was passed through an eight mesh screen and "slugged" as ¾" tablets. The "slugs" were granulated to a sixteen mesh screen size and pelleted as ⅛" x ⅛" cylindrical pellets. The pellets were calcined for eight hours at 800° F. and reduced with hydrogen. After cooling, the reduced pellets were covered with water for storage. The unreduced pellets were black in color and possessed excellent physical strength of 20 pounds dead weight load. This is a relatively high dead weight load, for the ⅛" x ⅛" pellets have only one eighth the mass of the ¼" pellets of Example 1, and would be expected to support much lower dead weight loads. This catalyst has excellent activity in various hydrogenation reactions such as the hydrogenation of oxoaldehydes to produce alcohols, benzene to produce cyclohexane, and the hydrogenation of ethylene linkages in various organic compounds.

*Example 5*

An alumina supported, tungsten oxide catalyst was prepared in the following manner. Forty parts by weight of tungsten oxide were mixed with 80 parts by weight of hydrated alumina. This mixture was dry mulled for five minutes. Aqueous polyvinyl acetate latex (2 parts by weight of 55% solids latex diluted to 20 parts by weight with water) was added and the mixture was mulled for an additional fifteen minutes. The wet mixture was dried in the air until readily pelletable, granulated to twelve mesh, and pelleted as 3/16" x 3/16" pellets utilizing 3 parts by weight of aluminum stearate as an additional lubricant. The pellets were then calcined in air at a temperature of about 950° F. for 8 hours. The calcined pellets were of a medium yellow color with excellent physical characteristics and a side crush strength in the range of from 30–45 pounds dead weight load. This tungsten oxide catalyst is useful in hydrogenation and dehydrogenation reactions, particularly those involving petroleum hydrocarbons.

*Example 6*

A non-supported tungsten oxide catalyst was prepared in the following manner. Four hundred parts of tungsten oxide were admixed with 20 parts of polyvinyl acetate latex (55% solids) diluted to 120 parts with water. This mixture was mulled for five minutes, dried in air, and sized to eighteen mesh. The sized material was mixed with 3% by weight of graphite and "slugged" into ¾" x ¾" pellets which were granulated and pelleted into 3/16" x 3/16" pellets. The pellets had a side crush strength of 10 pounds dead weight load, which is not as high as the strength of the supported catalyst of Example 5 but is quite suitable for many hydrogenation and dehydrogenation operations where higher catalyst activity is desired.

In the foregoing examples we have illustrated the use of vinyl-type resin latices as additives in preparing catalyst pellets from materials which are notoriously difficult to pellet. It will be obvious, to those familiar with the art, that materials which are less difficult to pellet may be prepared more easily by utilizing the materials and methods disclosed herein. As an example, we have prepared iron-chromia catalysts useful in carbon monoxide conversion reactions which exhibit very superior mechanical strength and resistance to sulfur bearing impurities. It will also be obvious that other methods of forming shaped catalysts such as extrusion and briquetting may benefit advantageously by utilization of the materials and methods of the present invention. Accordingly, many modifications and variations of the invention, as hereinbefore set forth and such as will present themselves to those familiar with the art, may be made without departing from the spirit and scope thereof which is commensurate with the following claims.

What is claimed is:

1. In the preparation of shaped catalyst pellets by compacting pulverulent catalyst ingredients, the improvement which comprises admixing with said pulverulent catalyst ingredients an aqueous, vinyl-type resin latex, the amount of latex being such that the amount of resin therein is between about one-half percent and about five percent of the weight of the catalyst ingredients, the resin of said latex having a particle size between about 0.05 and 15 microns, adjusting the water content of the mixture of catalyst ingredients and latex to a value such that the resin component of said latex exhibits binding properties and compacting the thus treated catalyst ingredients into shaped catalyst pellets.

2. The method of claim 1, wherein the resin component of the latex is a polyvinyl acetate resin.

3. The method of claim 1 wherein the resin component of the latex is a polyacrylate ester resin.

4. The method of claim 1 wherein the shaped catalyst pellets are completely dried and subjected to treatment at high temperature substantially above the decomposition temperature of the resin of the latex.

5. The method of claim 1 wherein the pulverulent catalyst ingredients comprise a metal chromite.

6. The method of claim 1 wherein the pulverulent catalyst ingredients comprise a nickel salt and an adsorbent siliceous carrier.

7. The method of claim 1 wherein the pulverulent catalyst ingredients comprise tungsten oxide.

References Cited in the file of this patent

UNITED STATES PATENTS

| | | |
|---|---|---|
| 2,107,611 | Jarl | Feb. 8, 1938 |
| 2,479,451 | Young | Aug. 16, 1949 |
| 2,540,599 | Segura | Feb. 6, 1951 |